United States Patent
Chiang et al.

(10) Patent No.: US 7,783,858 B2
(45) Date of Patent: Aug. 24, 2010

(54) REDUCING MEMORY OVERHEAD OF A PAGE TABLE IN A DYNAMIC LOGICAL PARTITIONING ENVIRONMENT

(75) Inventors: Men-Chow Chiang, Austin, TX (US); Kiet H. Lam, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 780 days.

(21) Appl. No.: 11/625,296

(22) Filed: Jan. 20, 2007

(65) Prior Publication Data

US 2008/0177974 A1 Jul. 24, 2008

(51) Int. Cl.
*G06F 12/10* (2006.01)
(52) U.S. Cl. .................. 711/207; 711/170; 711/173; 711/206
(58) Field of Classification Search .............. 711/207, 711/206, 173, 170
See application file for complete search history.

(56) References Cited

U.S. PATENT DOCUMENTS

| | | | |
|---|---|---|---|
| 6,438,671 B1 | 8/2002 | Doing et al. | |
| 6,829,684 B2 | 12/2004 | Doing et al. | |
| 6,993,640 B2 | 1/2006 | Doing et al. | |
| 7,107,431 B2 | 9/2006 | Chiang et al. | |
| 7,117,337 B2 | 10/2006 | Chiang et al. | |
| 7,296,139 B1 * | 11/2007 | Case et al. | 711/209 |
| 2005/0027960 A1 | 2/2005 | DeMent et al. | |
| 2005/0091476 A1 | 4/2005 | Doing et al. | |
| 2006/0095690 A1 | 5/2006 | Craddock et al. | |

OTHER PUBLICATIONS

Marron, A., "Sharing Read-Only Memory among Multiple Log Partitions", IBM Corporation, IBM Technical Disclosure Bulletin, Mar. 1993, vol. 36, No. 3, pp. 303-304.

* cited by examiner

*Primary Examiner*—Sanjiv Shah
*Assistant Examiner*—Jae U Yu
(74) *Attorney, Agent, or Firm*—Stephen J. Walder, Jr.; Matthew W. Baca

(57) ABSTRACT

Mechanisms for reducing memory overhead of a page table in a dynamic logical partitioning (LPAR) environment are provided. Each LPAR, upon its creation, is allowed to declare any maximum main memory size for the LPAR as long as the aggregate maximum main memory size for all LPARs does not exceed the total amount of available main memory. A single page table is used for all of the LPARs. Thus, the only page table in the computing system is shared by all LPARs and every memory access operation from any LPAR must go through the same page table for address translation. As a result, since only one page table is utilized, and the aggregate size of the main memory apportioned to each of the LPARs is limited to the size of the main memory, the size of the page table cannot exceed the size of the main memory.

18 Claims, 5 Drawing Sheets

REDUCING MEMORY OVERHEAD OF A PAGE TABLE IN A DYNAMIC LOGICAL PARTITIONING ENVIRONMENT

BACKGROUND

1. Technical Field

The present application relates generally to an improved data processing system and method. More specifically, the present application is directed to a system and method for reducing memory overhead of a page table in a dynamic logical partitioning environment.

2. Description of Related Art

Virtual memory mechanisms provide the ability to simulate more memory than actually exists in a computing system, thereby allowing the computing system to run larger programs or more programs concurrently. Virtual addressing provides a separation between the physical memory and the addresses that a program accesses to load or store data. One of the common uses of this separation is to facilitate paging to disk, which allows an operating system to make efficient use of primary memory, i.e. a volatile memory such as a RAM, by moving unused instructions and data into secondary memory, i.e. a non-volatile memory such as a hard disk, and then re-allocating the physical memory to another process.

When the original process references the virtual address where it expects its instructions or data to be, the operating system re-allocates physical primary memory (possibly having to move some additional primary memory to secondary memory), then moves these instructions and data back to this primary memory.

Virtual addressing provides many other benefits. One of the most important benefits of virtual addressing is that each process can write only to the physical memory for which the operating system has created page table entries. This prevents one process from overwriting another process's data.

As an example of virtual addressing, assume a computer architecture where a word size is 32 bits. This means addresses may be formed from 0x00000000 to 0xffffffff—spanning 4 GB. These addresses form what is called as the "virtual address space." These addresses have no physical meaning, i.e. if only 16 MB of memory is available, all addresses above 0x01000000 would be invalid. However, most programs do not use all 4 GB of memory when a program runs, but only parts of it at a time.

The 4 GB virtual address space is split up into chunks, commonly 4 KB in size, referred to as pages. The physical memory is also split up into chunks, also commonly 4 KB in size, referred to as "frames." A program's text segment might start at the virtual address 0x00000004—page number 0x0, and offset 0x4, but in reality, this may correspond to the physical address 0xff0e0004—frame number 0xff0e, and offset 0x4. What the virtual memory mechanism does is convert virtual addresses into physical addresses, essentially, mappings between pages and frames. The page table is used for this purpose.

FIG. 1 illustrates the use of a page table for mapping between pages and frames in accordance with a known architecture. Assume that a program is running and it tries to access memory in the virtual address 0xd09fbabe. The virtual address has two main portions, 0xd09f is the page number and 0xbabe is the offset within the page 0xd09f.

The virtual address (usually only the virtual page identifier portion of the virtual address), is first checked for validity, i.e. whether the address is within the valid virtual address ranges of the program. If the address is invalid, a processor interrupt occurs and the operating system sends a segmentation fault message and subsequently terminates the offending program. If the address is valid, the address is looked up within a translation lookaside buffer (TLB) 110. The TLB 110 is specifically designed to perform this lookup in parallel so as to provide an extremely fast lookup process. If there is a match for page 0xd09f within the TLB 110, i.e. a TLB "hit," the physical frame number is retrieved, the offset replaced, and the memory access can continue. However, if there is no match, i.e. a TLB "miss," the second mechanism checked is the page table 120.

When the hardware, i.e. the TLB 110, is unable to find a physical frame for a virtual page, i.e. there is a TLB miss, the processor initiates a "table walk" to essentially perform a look-up of the appropriate page table 120 in main memory (there is a separate page table for each logical partition utilized in the data processing system, as discussed hereafter). This "table walk" is performed completely in hardware, i.e. without any software involvement, each time there is a TLB miss.

The "table walk" looks up the hardware page table in main memory and determines if there is a valid translation (from virtual page identifier to physical identifier) found. If a valid translation is found, which occurs more often than not, the translation information is loaded into the TLB. The processor may then restart the instruction that caused the TLB miss.

If the "table walk" operation does not find a valid page translation, or mapping, entry in a hardware page table, then the hardware will generate a processor interrupt called a "page fault." Hardware architectures offer the chance for an interrupt handler 130 to be installed by the operating system to deal with such page faults. The interrupt handler 130 can look up the address mapping in the page table 120, and can see whether a mapping exists in the page table 120. If one exists, it is written back to the TLB 110, as the hardware accesses memory through the TLB 110 in a virtual memory system, and the faulting instruction is restarted, with the consequence that the hardware will look in the TLB 110 again, find the mapping, and the translation will succeed.

However, the page table lookup may not be successful for two reasons. First there may not be a translation available for that address and thus, the memory access to that virtual address is bad or invalid. Second, the page is not resident in physical memory.

In the first case, the memory access is invalid, and the operating system must take some action to deal with the problem. On modern operating systems, it will send a segmentation fault to the offending program. In the second case, the page is normally stored elsewhere, such as on a hard disk 140. To handle this case, the page needs to be taken from the hard disk 140 and put into physical memory. When physical memory is not full, this is quite simple, one simply needs to write the page into physical memory, modify the entry in the page table 120 to say that it is present in physical memory, write the mapping into the TLB 110 and restart the instruction.

However, when physical memory is full, and there are no free frames available, pages in physical memory may need to be swapped with the page that needs to be written to physical memory. The page table 110 needs to be updated to mark that the pages that were previously in physical memory are no longer so, and to mark that the page that was on the hard disk 140 is no longer so also (and to of course write the mapping into the TLB 110 and restart the instruction).

While the page table provides a convenient mechanism for mapping between virtual addresses and real physical memory addresses, a large amount of main memory is needed for storing the page table. Such memory requirements become even more of a concern in logically partitioned computing environments where the logical partitions of the system must each have their own page table. The memory overhead for the page tables for each of the logical partitions can become a substantial portion of the total main memory.

When creating a new logical partition in a logical partition (LPAR) environment, such as a shared processor LPAR (SPLPAR), a portion of main memory is allocated for the page table for the new LPAR. The size of the portion of memory allocated for the page table is proportional to the total main memory allocated to the partition. Since memory cannot be shared among LPARs, the total amount of main memory allocated to all partitions is no more than the total amount of main memory in the computing system. Therefore, the total amount of main memory allocated to page tables of all the LPARs should not be more than for the same system without the LPARs. In other words, the memory overhead due to page tables is no worse for a SPLPAR computing system than for a conventional non-LPAR computing system.

However, by introducing the additional functionality of dynamic LPARs, where the computing system can increase or decrease the amount of main memory allocated to a LPAR dynamically, the total memory overhead of page tables of all LPARs may increase to be much larger than the conventional non-LPAR computing system. This is because when the page table is allocated for a newly created LPAR, the page table size is not allocated based on the main memory actually allocated to the LPAR upon its creation, but instead the page table size is made large enough to accommodate the maximum main memory that may be dynamically allocated to the LPAR during its lifetime.

The main purpose of dynamic LPAR is to rebalance the computing system's hardware resources, main memory included, to better accommodate the daily, weekly, or unexpected large fluctuation of workloads among applications running in different LPARs of the same computing system. To effectively take advantage of this flexibility of resource balancing, it is common that a LPAR declare a much larger main memory limit than it asks for and is allocated at the LPAR creation time. Consequently, the total maximum memory size of all the LPARs, and thus, the total memory size of their page tables, may be much larger than the conventional non-LPAR computing system configuration.

For example, in known architectures the memory overhead ration of a page table to the associated main memory is 1:64, i.e. 1 GB of page table is required to accommodate 64 GB of main memory. If the dynamic range of the main memory allowed for each partition is 10X, the memory overhead of the page table alone becomes 10 GB, or about $\frac{1}{6}^{th}$ of all the main memory. This is a substantial portion of the total available main memory.

Known solutions for addressing this memory overhead problem include not allowing dynamic LPAR functionality. This completely solves the problem of memory overhead associated with dynamic LPAR since the functionality is not permitted to exist. However, as a result, the computing system can potentially be much less utilized after it loses the ability to load-balance the memory resource. This defeats one of the original major purposes of using LPAR environments.

Another known solution is to dynamically create a new page table when the total amount of main memory allocated to a LPAR is changed. As a result, it is not necessary to specify the size of the page table to be the maximum size required throughout the lifetime of the LPAR.

With this solution, although the computing system does not need to be shutdown for this solution, there will typically be a very long delay before a page table is completely created from scratch with a change in the LPAR. During this time period, the LPAR associated with the page table being created cannot perform useful work. For computing systems that have to meet established quality of service requirements, which typically do not allow extended periods of no service, this is not a feasible solution.

SUMMARY

The illustrative embodiments provide a system and method for reducing memory overhead of a page table in a dynamic logical partitioning (LPAR) environment. The system and method of the illustrative embodiments allow each LPAR to use a maximum of all the main memory during its lifetime without any declaration of the maximum need upon the LPAR's creation, as long as at any time the aggregate main memory size for all LPARs does not exceed the total amount of main memory for the whole computing system. In addition, a single page table is used for all of the LPARs, rather than a different page table for each LPAR. Thus, the only page table in the computing system is shared by all LPARs and every memory access operation from any LPAR must go through the same page table for address translation. As a result, since only one page table is utilized, and the aggregate size of the main memory apportioned to each of the LPARs is limited to the size of the main memory, the size of the single page table only needs to be large enough to cover the translation of the main memory. In particular, the page table size is exactly the same as in a conventional computer system that does not have the LPAR or DLPAR functionality.

Since the main purpose of a page table is to translate virtual addresses to real physical memory addresses, the shared page table of the illustrative embodiments needs to meet the requirement that access from different LPARs should use different sets of non-overlapping page table entries. With the illustrative embodiments, this is accomplished by using a portion of the virtual address space, or extending the virtual address space to include additional bits, to specify a partition identifier allocated, by a virtualization mechanism such as a hypervisor, to the operating system of a LPAR when the LPAR is created. In this way, each LPAR may still generate a standard virtual address for each memory access, but with the addition of the partition identifier, each LPAR will generate a virtual address in their own non-overlapping segments of the virtual address space.

As a result, access to the shared page table will not create any conflict because no two LPARs can generate exactly the same virtual address, i.e. they differ at least in the partition identifier field. Moreover, dynamically changing the amount of main memory allocated to a LPAR becomes trivially simple. All that is necessary is for the virtualization mechanism, e.g., the hypervisor, to be informed of the change in allocated main memory. The virtualization mechanism is responsible for allocating (and rebalancing) hardware resources of LPARs, among other LPAR management tasks and LPAR runtime support. The virtualization mechanism may then carry out the change in main memory allocation in a manner that is unlikely to have any discernible performance impact on the computing system.

For example, to change the amount of main memory allocated to a LPAR, the virtualization mechanism need only modify the main memory limit of the LPAR and make changes to the main memory pool data structures. This can be done concurrently and asynchronously with no disruption to the activity in the LPAR. As a result, the applications running in a LPAR gradually gain the benefit of increased main memory allocation by experiencing less frequent page faults or by gradually experiencing more page faults due to shrinking of its allocated main memory pool.

In one illustrative embodiment, a method for virtualizing access to a main memory is provided. The method may comprise allocating portions of the main memory to a plurality of logical partitions in the data processing system. The method may further comprise generating a single shared page table having a plurality of page table entries. The plurality of page table entries may comprise page table entries for accessing each of the portions of the main memory allocated to each of the logical partitions in the plurality of logical partitions. Moreover, the method may comprise utilizing the single shared page table to access the portions of the main memory.

The method may further comprise allocating a logical partition identifier portion of a virtual address space, used by the single shared page table, for specifying a logical partition identifier of an associated logical partition. Each logical partition in the plurality of logical partitions may have a different unique logical partition identifier. By virtue of the logical partition identifier portion of the virtual address space, each logical partition of the plurality of logical partition may generate virtual addresses in their own non-overlapping segments of the virtual address space.

The method may further comprise controlling access to portions of the single shared page table based on the logical partition identifier in the logical partition identifier portion of virtual addresses used to access the single shared page table such that entries in the single shared page table associated with a first logical partition having a first logical partition identifier are not accessible by a second logical partition having a second logical partition identifier. Moreover, the method may comprise dynamically modifying an amount of the main memory allocated to a logical partition in the plurality of logical partitions by notifying an input/output virtualization mechanism of the modification. The input/output virtualization mechanism may modify a main memory limit associated with the logical partition and updates main memory pool data structures in response to receiving the notification of the modification.

The logical partition identifier for a logical partition may be assigned to an operating system associated with the logical partition by an input/output virtualization mechanism. The logical partition identifiers for each logical partition in the plurality of logical partitions may be maintained by the input/output virtualization mechanism. In one illustrative embodiment, one logical partition of the plurality of logical partitions cannot access a logical partition identifier of another logical partition in the plurality of logical partitions. Each portion of main memory allocated to each logical partition of the plurality of logical partition may be any size portion of the main memory as long as the aggregate of the allocated main memory portions for the plurality of logical partitions does not exceed a total size of the main memory.

Utilizing the single shared page table to access the portions of the main memory may comprise receiving a request from a logical partition, the request specifying a virtual address for an operation to be performed, and appending, via a hardware mechanism, a logical partition identifier to the virtual address, the logical partition identifier being stored in a hardware register. A virtual-to-real address translation may be retrieved from the single shared page table based on a combination of the virtual address and the logical partition identifier appended to the virtual address. The logical partition identifier stored in the hardware register may be only modifiable by a virtualization mechanism upon a logical partition context switch event.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, an apparatus is provided. The apparatus may comprise a processor and a memory coupled to the processor. The memory may comprise instructions which, when executed by the processor, cause the processor to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figure 2:
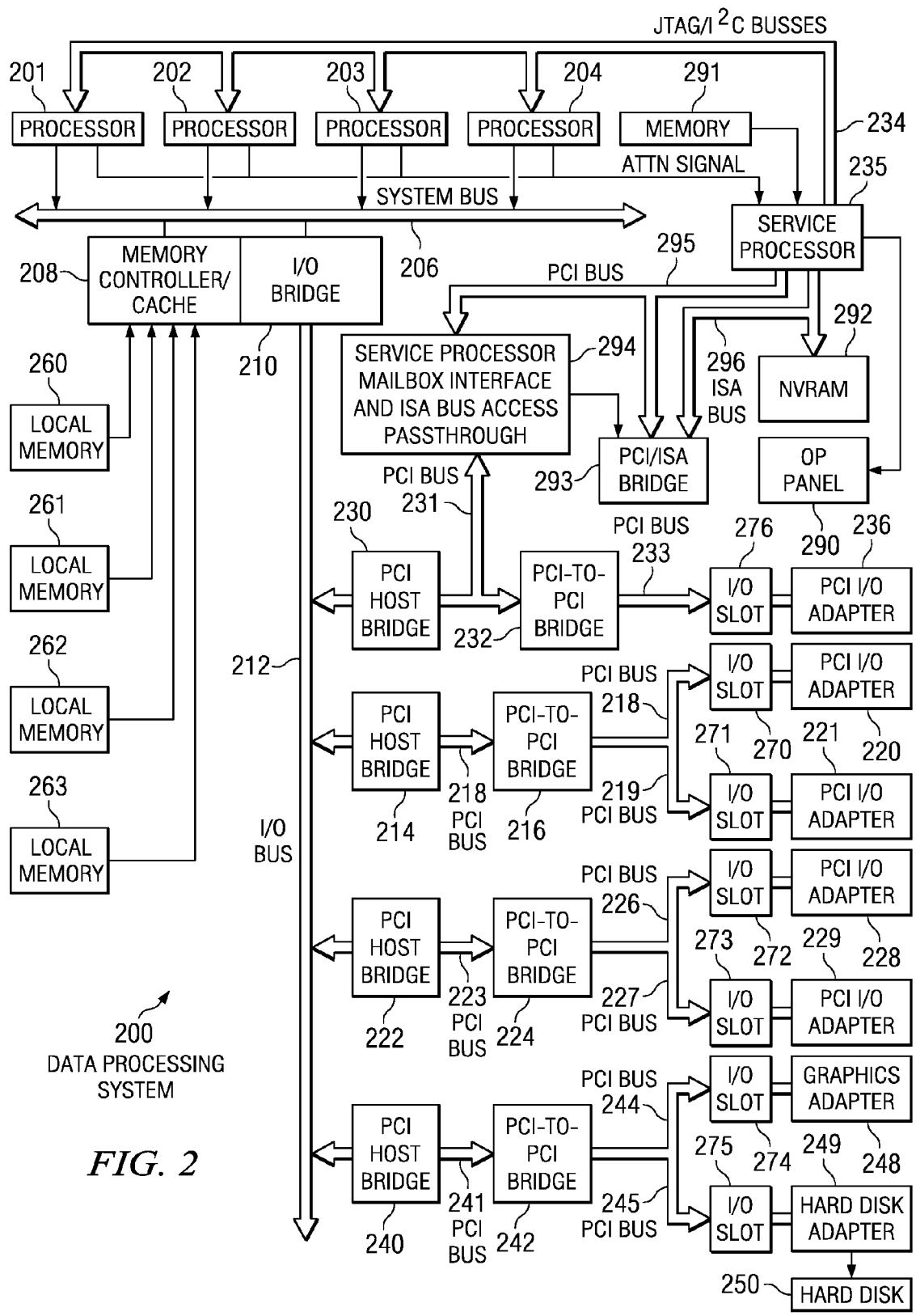
FIG. 2 is an exemplary block diagram of a data processing system in which the illustrative embodiments may be implemented.
Figure 3:
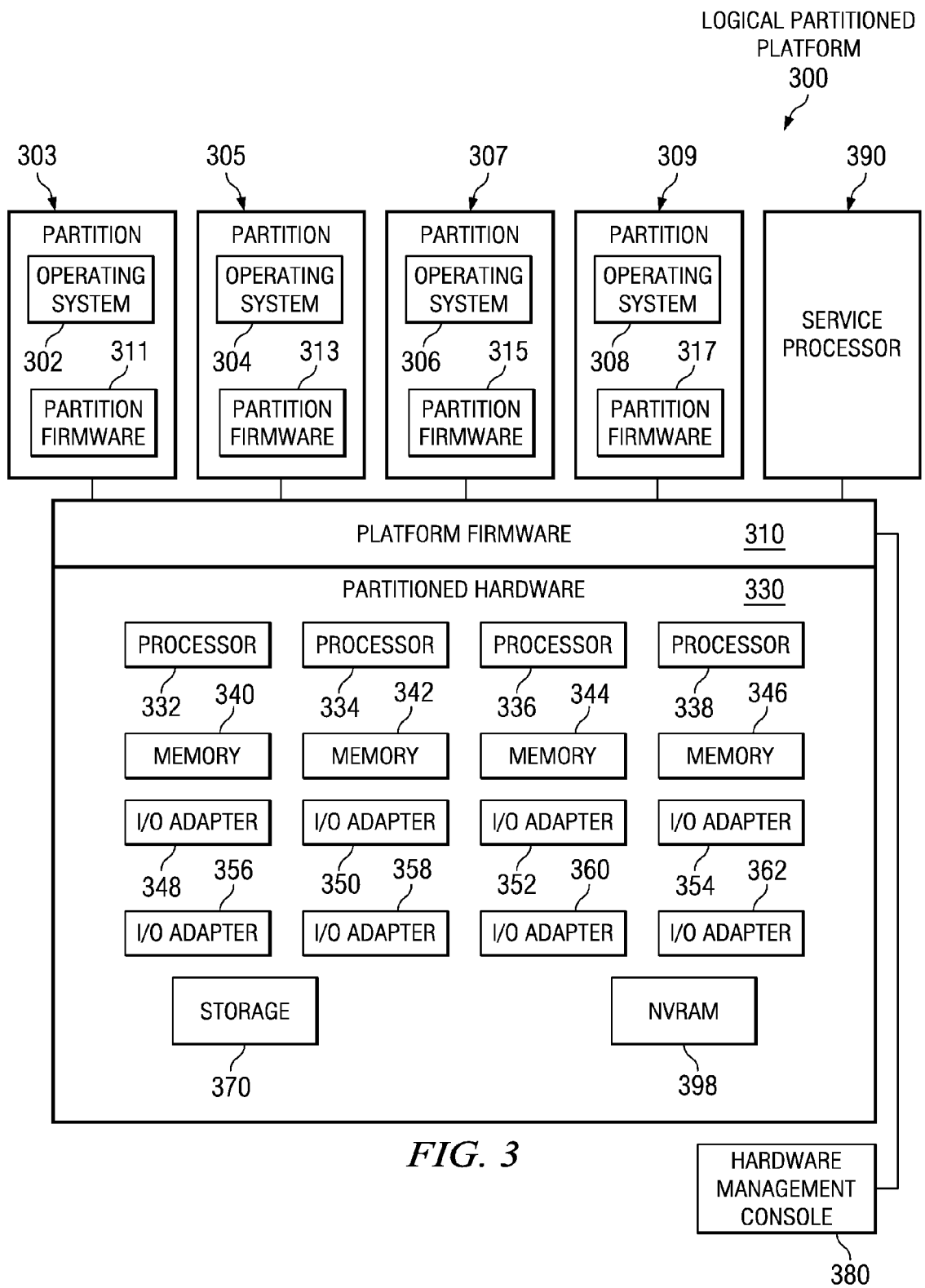
FIG. 3 is a block diagram of an exemplary logically partitioned platform is depicted in which the illustrative embodiments may be implemented.

The illustrative embodiments provide a mechanism by which memory overhead of a page table in a dynamic logical partitioning environment is reduced. Thus, FIGS. 2-3 are provided hereafter in order to provide a context illustrating the exemplary data processing environments in which the exemplary aspects of the illustrative embodiments may be implemented. The exemplary data processing environments illustrated in FIGS. 2-3 are only exemplary and are not intended to state or imply any limitation with regard to the types or configurations of data processing environments in which the illustrative embodiments may be implemented. Many modifications to the depicted data processing environments may be made without departing from the spirit or scope of the present invention.

With reference now to the figures, and in particular with reference to FIG. 2, an exemplary block diagram of a data processing system in which the illustrative embodiments may be implemented is depicted. The data processing system 200 may be a symmetric multiprocessor (SMP) system, or a heterogeneous multiprocessor system, including a plurality of processors 201, 202, 203, and 204 connected to system bus 206. For example, the data processing system 200 may be an IBM eServer, a product of International Business Machines Corporation of Armonk, N.Y., implemented as a server within a network. Moreover, the data processing system 100 may be a Cell Broadband Engine (CBE) data processing system, another product of International Business Machines Corporation. Alternatively, a single processor system may be employed.

Also connected to the system bus 206 is memory controller/cache 208, which provides an interface to a plurality of local memories 260-263. Input/Output (I/O) bus bridge 210 is connected to the system bus 206 and provides an interface to the I/O bus 212. The memory controller/cache 208 and the I/O bus bridge 210 may be integrated as depicted.

The data processing system 200 is a logical partitioned (LPAR) data processing system. Thus, the data processing system 200 may have multiple heterogeneous operating systems (or multiple instances of a single operating system) running simultaneously. Each of these multiple operating systems may have any number of software programs executing within it. The data processing system 200 is logically partitioned such that different PCI I/O adapters 220-221, 228-229, and 236, graphics adapter 248, and hard disk adapter 249 may be assigned to different logical partitions (LPARs). In this case, graphics adapter 248 provides a connection for a display device (not shown), while hard disk adapter 249 provides a connection to control the hard disk 250.

Thus, for example, assume data processing system 100 is divided into three logical partitions, P1, P2, and P3. Each of the PCI I/O adapters 220-221, 228-229, 236, the graphics adapter 248, the hard disk adapter 249, each of the host processors 201-204, and memory from the local memories 260-263 are assigned to the three partitions.

In these examples, the memories 260-263 may take the form of dual in-line memory modules (DIMMs). The DIMMs are not normally assigned on a per DIMM basis to the partitions but rather, a partition will be assigned a portion of the overall memory seen by the platform. For example, processor 201, some portion of memory from the local memories 260-263, and the I/O adapters 220, 228, and 229 may be assigned to logical partition P1; processors 202-203, some portion of memory from the local memories 260-263, and the PCI I/O adapters 221 and 236 may be assigned to partition P2; and processor 204, some portion of memory from the local memories 260-263, the graphics adapter 248 and the hard disk adapter 249 may be assigned to logical partition P3.

Each operating system executing within the data processing system 200 is assigned to a different logical partition. Thus, each operating system executing within the data processing system 200 may access only those I/O units that are within its logical partition. For example, one instance of the Advanced Interactive Executive (AIX) operating system may be executing within partition P1, a second instance (image) of the AIX operating system may be executing within partition P2, and a Linux or OS/400 operating system may be operating within logical partition P3.

The peripheral component interconnect (PCI) host bridge 214, connected to the I/O bus 212, provides an interface to the PCI local bus 215. A number of PCI input/output adapters 220-221 may be connected to the PCI bus 215 through the PCI-to-PCI bridge 216, the PCI bus 218, the PCI bus 219, the I/O slot 270, and the I/O slot 271. The PCI-to-PCI bridge 216 provides an interface to the PCI bus 218 and the PCI bus 219. The PCI I/O adapters 220 and 221 are placed into the I/O slots 270 and 271, respectively. Typical PCI bus implementations will support between four and eight I/O adapters (i.e. expansion slots for add-in connectors). Each PCI I/O adapter 220-221 provides an interface between the data processing system 200 and input/output devices.

An additional PCI host bridge 222 provides an interface for an additional PCI bus 223. The PCI bus 223 is connected to a plurality of PCI I/O adapters 228-229. The PCI I/O adapters 228-229 may be connected to the PCI bus 223 through the PCI-to-PCI bridge 224, the PCI bus 226, the PCI bus 227, the I/O slot 272, and the I/O slot 273. The PCI-to-PCI bridge 224 provides an interface to the PCI bus 226 and the PCI bus 227. The PCI I/O adapters 228 and 229 are placed into the I/O slots 272 and 273, respectively. In this manner, additional I/O devices, such as, for example, modems or network adapters may be supported through each of PCI I/O adapters 228 and 229. In this manner, the data processing system 200 allows connections to multiple network computers.

A memory mapped graphics adapter 248 inserted into the I/O slot 274 may be connected to the I/O bus 212 through the PCI bus 244, the PCI-to-PCI bridge 242, the PCI bus 241 and the PCI host bridge 240. The hard disk adapter 249 may be placed into the I/O slot 275, which is connected to the PCI bus 245. In turn, this bus is connected to the PCI-to-PCI bridge 242, which is connected to the PCI host bridge 240 by the PCI bus 241.

A PCI host bridge 230 provides an interface for a PCI bus 231 to connect to the I/O bus 212. The PCI I/O adapter 236 is connected to the I/O slot 276, which is connected to the PCI-to-PCI bridge 232 by the PCI bus 233. The PCI-to-PCI bridge 232 is connected to the PCI bus 231. This PCI bus 131 also connects the PCI host bridge 230 to the service processor mailbox interface and ISA bus access pass-through logic 294. The service processor mailbox interface and ISA bus access pass-through logic 294 forwards PCI accesses destined to the PCI/ISA bridge 293. The non-volatile RAM (NVRAM) storage 192 is connected to the ISA bus 296.

The service processor 235 is coupled to the service processor mailbox interface and ISA bus access pass-through logic 294 through its local PCI bus 295. The service processor 235 is also connected to processors 201-204 via a plurality of JTAG/I$^2$C busses 234. The JTAG/I$^2$C busses 234 are a combination of JTAG/scan busses (see IEEE 1149.1) and Phillips I$^2$C busses. However, alternatively, JTAG/I$^2$C busses 234 may be replaced by only Phillips I$^2$C busses or only JTAG/scan busses. All SP-ATTN signals of the host processors 201, 202, 203, and 204 are connected together to an interrupt input signal of the service processor 235. The service processor 235 has its own local memory 291 and has access to the hardware OP-panel 290.

When the data processing system 200 is initially powered up, the service processor 235 uses the JTAG/I$^2$C busses 234 to interrogate the system (host) processors 201-204, the memory controller/cache 208, and the I/O bridge 210. At completion of this step, the service processor 235 has an inventory and topology understanding of the data processing system 200. The service processor 235 also executes Built-In-Self-Tests (BISTs), Basic Assurance Tests (BATs), and memory tests on all elements found by interrogating the host processors 201-204, the memory controller/cache 208, and the I/O bridge 210. Any error information for failures detected during the BISTS, BATs, and memory tests are gathered and reported by the service processor 235.

If a valid configuration of system resources is still possible after taking out the elements found to be faulty during the BISTs, BATs, and memory tests, then the data processing system 200 is allowed to proceed to load executable code into the local (host) memories 260-263. The service processor 235 then releases the host processors 201-204 for execution of the code loaded into the local memory 260-263. While the host processors 201-204 are executing code from respective operating systems within data processing system 200, the service processor 235 enters a mode of monitoring and reporting errors. The type of items monitored by the service processor 235 include, for example, the cooling fan speed and operation, thermal sensors, power supply regulators, and recoverable and non-recoverable errors reported by the processors 201-204, the local memories 260-263, and the I/O bridge 210.

The service processor 235 is responsible for saving and reporting error information related to all the monitored items in the data processing system 200. The service processor 235 also takes action based on the type of errors and defined thresholds. For example, the service processor 235 may take note of excessive recoverable errors on a processor's cache memory and decide that this is predictive of a hard failure. Based on this determination, the service processor 235 may mark that resource for de-configuration during the current running session and future Initial Program Loads (IPLs).

The data processing system 200 may be implemented using various commercially available computer systems. For example, the data processing system 200 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the illustrative embodiments set forth hereafter but is only meant to provide one example of a data processing system in which the exemplary aspects of the illustrative embodiments may be implemented.

With reference now to FIG. 3, a block diagram of an exemplary logically partitioned platform is depicted in which the illustrative embodiments may be implemented. The hardware in the logically partitioned platform 300 may be implemented, for example, using the hardware of the data processing system 200 in FIG. 2.

The logically partitioned platform 300 includes partitioned hardware 330, operating systems 302, 304, 306, 308, and partition management firmware 310. The operating systems 302, 304, 306, and 308 may be multiple copies of a single operating system or multiple heterogeneous operating systems simultaneously run on the logically partitioned platform 300. These operating systems may be implemented, for example, using OS/400, which is designed to interface with a virtualization mechanism, such as partition management firmware, e.g., a hypervisor. OS/400 is used only as an example in these illustrative embodiments. Of course, other types of operating systems, such as AIX and Linux, may be used depending on the particular implementation. Operating systems 302, 304, 306, and 308 are located in logical partitions 303, 305, 307, and 309, respectively.

Hypervisor software is an example of software that may be used to implement platform (in this example, partition management) firmware 310 and is available from International Business Machines Corporation. Firmware is "software" stored in a memory chip that holds its content without electrical power, such as, for example, a read-only memory (ROM), a programmable ROM (PROM), an erasable programmable ROM (EPROM), and an electrically erasable programmable ROM (EEPROM).

The logical partitions 303, 305, 307, and 309 also include partition firmware 311, 313, 315, and 317. The partition firmware 311, 313, 315, and 317 may be implemented using IPL or initial boot strap code, IEEE-1275 Standard Open Firmware, and runtime abstraction software (RTAS), which is available from International Business Machines Corporation.

When the logical partitions 303, 305, 307, and 309 are instantiated, a copy of the boot strap code is loaded into the logical partitions 303, 305, 307, and 309 by the platform firmware 310. Thereafter, control is transferred to the boot strap code with the boot strap code then loading the open firmware and RTAS. The processors associated or assigned to the logical partitions 303, 305, 307, and 309 are then dispatched to the logical partition's memory to execute the logical partition firmware.

The partitioned hardware 330 includes a plurality of processors 332-338, a plurality of system memory units 340-346, a plurality of input/output (I/O) adapters 348-362, and a storage unit 370. Each of the processors 332-338, the memory units 340-346, the NVRAM storage 398, and the I/O adapters 348-362 may be assigned to one of the multiple logical partitions 303, 305, 307, and 309 within the logically partitioned platform 300, each of which corresponds to one of operating systems 302, 304, 306, and 308.

The platform firmware 310 performs a number of functions and services for the logical partitions 303, 305, 307, and 309 to create and enforce the partitioning of the logical partitioned platform 300. The platform firmware 310 is a firmware implemented virtual machine identical to the underlying hardware. Thus, the platform firmware 310 allows the simultaneous execution of independent OS images 302, 304, 306, and 308 by virtualizing all the hardware resources of the logical partitioned platform 300.

The service processor 390 may be used to provide various services, such as processing of platform errors in the logical partitions 303, 305, 307, and 309. The service processor 390 may also act as a service agent to report errors back to a vendor, such as International Business Machines Corporation. Operations of the different logical partitions may be controlled through a hardware management console 380. The hardware management console 380 is a separate data processing system from which a system administrator may perform various functions including reallocation of resources to different logical partitions.

The illustrative embodiments provide a system and method, which may be implemented in the data processing environments illustrated in FIGS. 2-3 for example, for reducing memory overhead of a page table in a dynamic logical partitioning (LPAR) environment. The system and method of the illustrative embodiments allow each LPAR to use a maximum of all the main memory during its lifetime without any declaration of the maximum need of the LPAR upon the LPAR's creation, as long as at any time the aggregate main memory size for all LPARs does not exceed the total amount of main memory for the whole computing system. In addition, a single page table is used for all of the LPARs, rather than different page tables for each LPAR. Thus, the only page table in the computing system is shared by all LPARs and every memory access operation from any LPAR must go through the same page table for address translation. As a result, since only one page table is utilized, and the aggregate size of the main memory apportioned to each of the LPARs is limited to the size of the main memory, the size of the single page table only needs to be large enough to cover the translation of the main memory. In particular, the page table size is exactly the same as in a conventional computer system that does not have the LPAR or DLPAR functionality.

Since the main purpose of a page table is to translate virtual addresses to real physical memory addresses, the shared page table of the illustrative embodiments needs to meet the requirement that access from different LPARs should use different sets of non-overlapping page table entries. With the illustrative embodiments, this is accomplished by using a portion of the virtual address space, or extending the virtual address space to include additional bits, to specify a partition identifier allocated, by a virtualization mechanism such as a hypervisor, to the operating system of a LPAR when the LPAR is created. In this way, each LPAR may still generate a standard virtual address for each memory access, but with the addition of the partition identifier, each LPAR will generate a virtual address in their own non-overlapping segments of the virtual address space.

Figure 4:
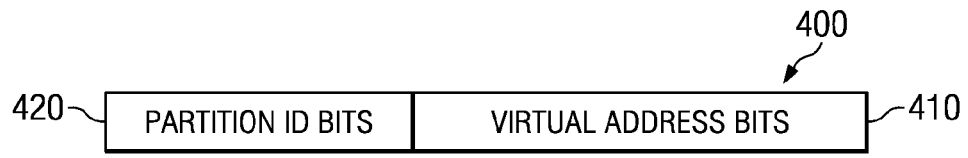
FIG. 4 is an exemplary block diagram of a virtual address in accordance with one illustrative embodiment.

FIG. 4 is an exemplary block diagram of a virtual address in accordance with one illustrative embodiment. The virtual address 400 shown in FIG. 4 is a virtual address for the virtual address space of a 64 bit processor architecture in which there are 80 bits defined for the virtual address. While the depicted example uses a 64 bit processor architecture virtual address space as an example, it should be appreciated that the illustrative embodiments are not limited to such and other sizes and configurations of virtual addresses may be used without departing from the spirit and scope of the present invention.

Usually, only a very small fraction of the 80 bits in the virtual address 400 are actually used in a real system or a logical partition. For example, only the portion 410, representing the first 68 bits of the virtual address 400, for example, is actually used to represent the virtual address use in the real system or logical partition with the other bits 420 typically being unused. Hence, if the operating system reserves the portion 420, or some sub-portion, e.g., 12 bits, in the virtual address then this reserved portion 420 may be used to supply a logical partition identifier, hereafter referred to as the partition ID. As a result, each logical partition still generates an 80 bit virtual address for each memory access, but the 80 bit virtual address includes the actual virtual address bits 410 and bits 420 representing a partition ID.

The partition ID may be allocated to the operating system of a logical partition when its logical partition (LPAR) is created. Such allocation may be made, for example, by a virtualization mechanism such as a hypervisor or other virtualization intermediary software or firmware.

Because the virtual address 400 according to the illustrative embodiments includes both the virtual address bits 410 typically used by the system or logical partition and partition ID bits 420, different logical partitions of the system may generate the same virtual address bits 410 but with differing partition ID bits 420. Thus, no two logical partitions can generate the same overall virtual address 400 since the partition ID bits 420 will always be different between the two logical partitions.

Since no two logical partitions can generate the same virtual address 400, it becomes possible to use a single shared page table to store page information for all of the logical partitions of a system, rather than having to have a separate page table for each logical partition. That is, access to a shared page table using the virtual address of the illustrative embodiments will not create any conflict because no two LPARs can generate exactly the same virtual address, i.e. they differ at least in the partition ID portion 420.

Figure 5:
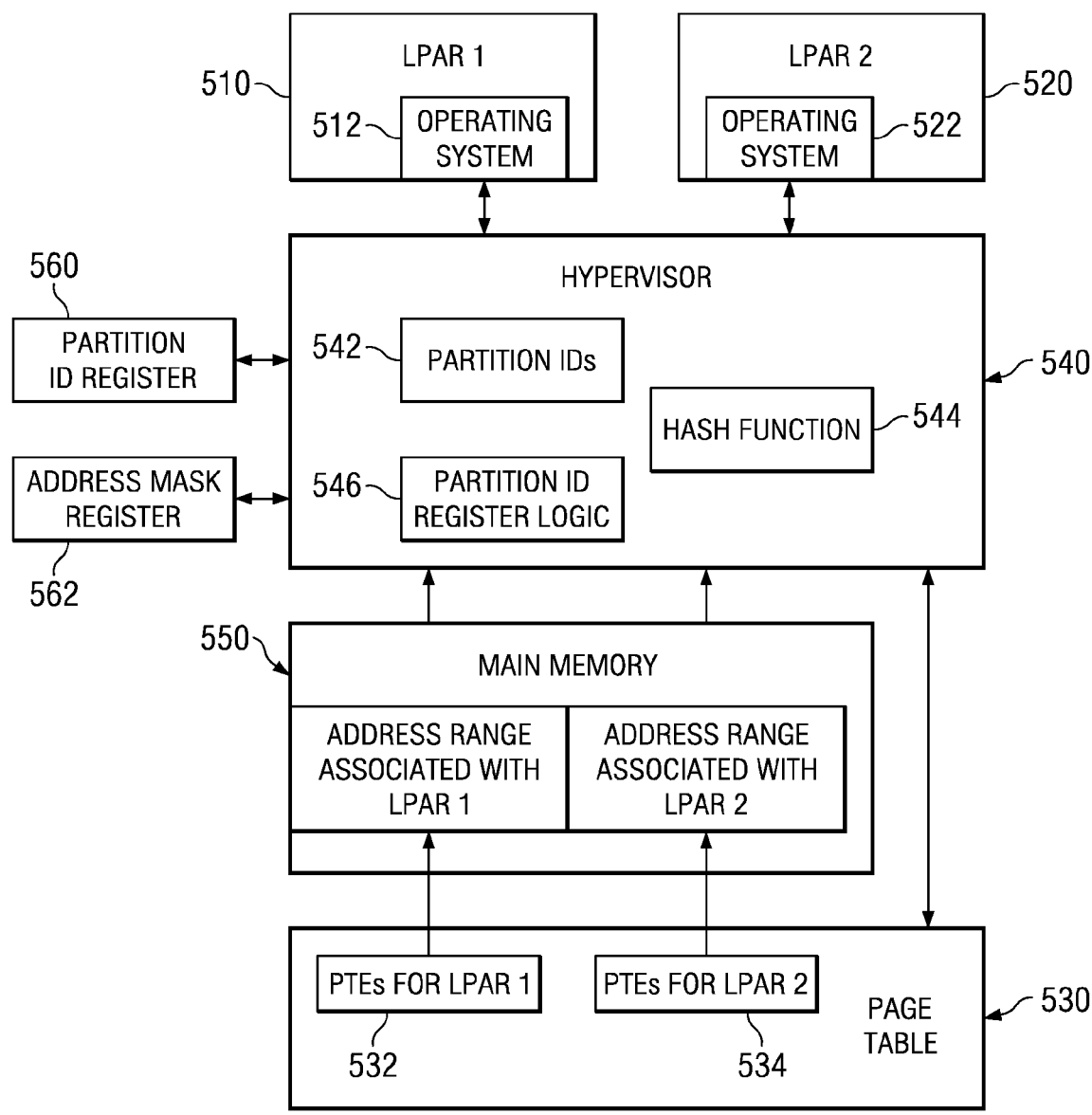
FIG. 5 is an exemplary diagram of the primary operational components according to one illustrative embodiment.

FIG. 5 is an exemplary diagram of the primary operational components according to one illustrative embodiment. When a logical partition 510 or 520 is created, it is assigned a portion of main memory 550. Such assignment may be made, for example, by a virtualization mechanism, such as a hypervisor 540, which is responsible for managing and controlling the virtualization of the data processing system. As mentioned above, each logical partition 510 and 520 may be allocated any size portion of the main memory 550 as long as the aggregate of the allocated main memory 550 portions for the logical partitions 510 and 520 does not exceed the total size of the main memory 550.

In addition, when the logical partition 510 or 520 is created, the logical partition is assigned a unique partition ID for identifying that partition in the virtual addressing mechanism of the hypervisor 540. The partition IDs are maintained by the hypervisor 540, such as in the partition IDs storage 542, and are not directly accessible by the logical partitions 510 and 520. In this way, one logical partition 520 cannot access the partition ID of another logical partition 510 and, as a result, cannot access the data/instructions associated with that other logical partition 510.

Figure 1:
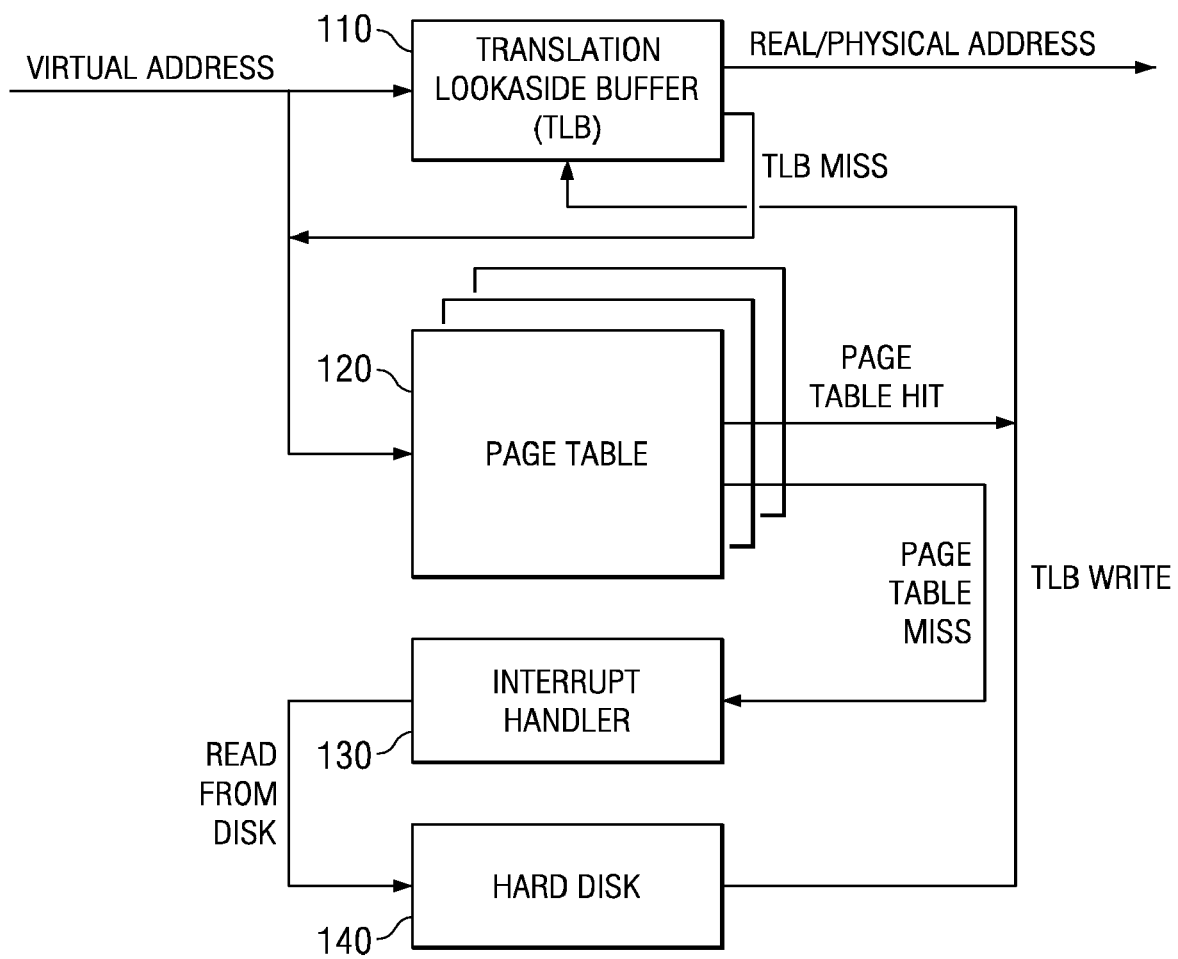
FIG. 1 illustrates the use of a page table for mapping between pages and frames in accordance with a known architecture.

The address ranges of main memory 550 associated with the logical partitions are virtualized by the hypervisor 540 such that the applications operating within the logical partitions utilize virtual addresses in memory access operations which are converted, by way of the page table 530, to real addresses in order to access the main memory 550. Such virtualization may be performed in a manner similar to that described previously with regard to FIG. 1 above.

The operating systems 512 and 522 of the logical partitions 510 and 520, respectively, are modified so as to reserve a portion of the virtual addresses generated by the logical partition such that the reserved portion is not utilized by the operating system. This reserved portion of the virtual address will be populated with the partition ID by the hypervisor 540, as described hereafter.

It is important to note, with the illustrative embodiments only one page table 530 is utilized for all of the logical partitions 510-520 rather than having a separate page table for each logical partition. The address ranges of the main memory 550 associated with the logical partitions 510-520 have corresponding page table entries (PTEs) 532 and 534 in the page table 530. Thus, the hypervisor 540 needs to only manage and maintain one page table 530 for all of the logical partitions 510-520, thereby simplifying the operation of the hypervisor 540 considerably.

In order to avoid collisions in the page table 530 by logical partitions 510-520 using the same virtual address to access the main memory 550, the unique partition IDs are used to eliminate the ability of the logical partitions 510-520 from generating the same overall virtual address. That is, the logical partitions 510-520 submit virtual addresses in a manner generally known in the art. The hypervisor 540 then appends or inserts the partition ID for the corresponding logical partition 510-520 into the reserved portion of the virtual address before attempting to access the page table 530 (or a translation lookaside buffer (TLB) if one is utilized). As a result, no address generated by one logical partition 510 can match an address generated by another logical partition 520.

The page table 530, as is generally known in the art, is a hashed page table wherein virtual addresses are hashed using a hash function 544 and the resulting hash is used to index into the page table 530 to identify a particular corresponding PTE which is then used to convert the virtual address to a real address for accessing the main memory 550. With the mechanisms of the illustrative embodiments, since the virtual address submitted by the logical partitions 510-520 are augmented by the hypervisor 540 to include the unique partition ID associated with the logical partition 510-520 from which the virtual address is received prior to submitting the virtual address to the hash function 544, the PTEs for the logical partitions 510-520 are effectively separated in the page table 530 such that one logical partition 510 cannot access the PTEs of the other logical partitions 520. While FIG. 5 shows the PTEs to be cohesive groups 532 and 534 of PTEs, it should be appreciated that the PTEs may in fact be intermingled within the page table 530 but nonetheless are only accessible by their corresponding logical partitions 510 and 520.

To maintain the security of the data processing system, it is important to ensure that the virtual address generated by one logical partition 510 will not be used to access the memory of other logical partitions 520. This is done by using hardware to fill the partition ID field of the virtual address, i.e. in the reserved portion of the virtual address. A hardware register, referred to as the partition ID register 560, is utilized for this purpose.

The partition ID stored in this partition ID register 560 is used to populate the reserved portion of the virtual addresses generated by the logical partitions 510-520. The value stored in this partition ID register 560 is maintained by the hypervisor 540 which only allows the value in the partition ID register 560 to be changed upon a logical partition context switch by the hypervisor 540. The hypervisor 540 includes partition ID register logic 546 which is responsible for determining when to update the value in the partition ID register 560. When the hypervisor performs a context switch from one logical partition 510 to another logical partition 520, the hypervisor 540 instructs the partition ID register logic 546 to retrieve the partition ID from the partition ID storage 542 for the logical partition 520 to which the context is being switched and to store that partition ID in the partition ID register 560. Thus, the partition ID register 560 always stores the partition ID of the currently active logical partition.

Thus, the value in the partition ID register 560 is only allowed to be changed by a trusted virtualization mechanism, e.g., hypervisor 540, and only upon a logical partition context switch. Furthermore, only the value stored in the partition ID register 560 may be used to populate the reserved portion of a received virtual address from a logical partition 510-520. As a result, the partition IDs that are used to ensure the uniqueness of the virtual addresses between logical partitions 510 and 520 are only accessible by hardware and trusted software. Thus, the applications or other software in the logical partitions 510 and 520 cannot directly access the partition IDs used by the mechanisms of the illustrative embodiment, thereby eliminating the ability of one logical partition 510 utilizing the partition ID of another logical partition 520.

It should be appreciated that when the hardware of a data processing system is created, the number of virtual address bits used by this hardware is typically fixed thereafter. Thus, in order to permit the mechanisms of the illustrative embodiments to be utilized with legacy hardware or to increase the flexibility of the application of the illustrative embodiments to various hardware configurations, the address mask register 562 is provided.

The address mask register 562 is used by the hypervisor 540 to store an address mask for specifying the bits that are to be used in a virtual address for storing the partition ID in accordance with the illustrative embodiments. The address mask in the address mask register 562 allows the size and exact bit positions of the partition ID field in the virtual address to be made more flexible. The address mask in the address mask register 562 may be used along with the partition ID in the partition ID register 560 to modify selected bits of a virtual address generated by a logical partition 510-520. In this way, the number of bits for the partition ID, and the corresponding bit positions in the virtual address can be determined by the hypervisor 540 after the hardware, e.g., the processor(s), have been implemented.

In fact, with this address mask register 562, flexibility is provided for even disallowing the modification of the virtual address to include the partition ID field. This may be useful in a non-logical partitioned system where there is no need to have a partition ID field. Moreover, the use of the address mask register 562 maintains processor backward compatibility to run older operating systems that do not reserve the partition ID field in the virtual address. That is, with the address mask register 562 being utilized, it is no longer necessary for the operating system to reserve a portion of the virtual address for the partition ID field and the determination of where to insert the partition ID field, if at all, may be left up to the hypervisor 540 through the setting of the address mask in the address mask register 562.

Thus, with the mechanisms of the illustrative embodiments, a single page table 530 is permitted to be used for handling virtual to real address translations for all of the logical partitions 510-520 of a data processing system. Thus, all virtual addresses generated by the logical partitions 510-520 are passed by the hypervisor 540 through the same shared page table 530 for translation purposes. Mechanisms are provided for ensuring the separation of page table entries between logical partitions by utilizing unique partition IDs which are only accessible by hardware or trusted software, e.g., the hypervisor 540. Thus, security of the data processing system is maintained such that one logical partition 510 may not access the data/instructions associated with another logical partition 520 in the main memory 550 via the shared page table 530.

With the mechanisms of the illustrative embodiments, dynamically changing the amount of main memory 550 allocated to a logical partition 510, such as in a dynamic logical partitioning (DLPAR) environment becomes trivially simple. All that is necessary is for the virtualization mechanism, e.g., the hypervisor 540, to be informed of the change in allocated main memory 550 by the operating system 512 of the logical partition 510. The hypervisor 540 then changes the allocation of main memory 550 among the logical partitions 510-520. The hypervisor 540 may carry out the change in main memory allocation in a manner that is unlikely to have any discernible performance impact on the data processing system.

For example, to change the amount of main memory 550 allocated to a logical partition 510, the hypervisor 540 need only modify the main memory limit of the logical partition 510, maintained in the hypervisor 540, and add, or remove, physical page frames to/from the free page frame pool, i.e. a linked list of unallocated physical page frames, of the logical partition 510. This can be done concurrently and asynchronously with no disruption to the activity in the logical partition 510. As a result, the applications running in a logical partition 510 gradually gain the benefit of increased main memory 550 allocation by experiencing less frequent page faults or by gradually experiencing more page faults due to shrinking of its allocated main memory pool.

Figure 6:
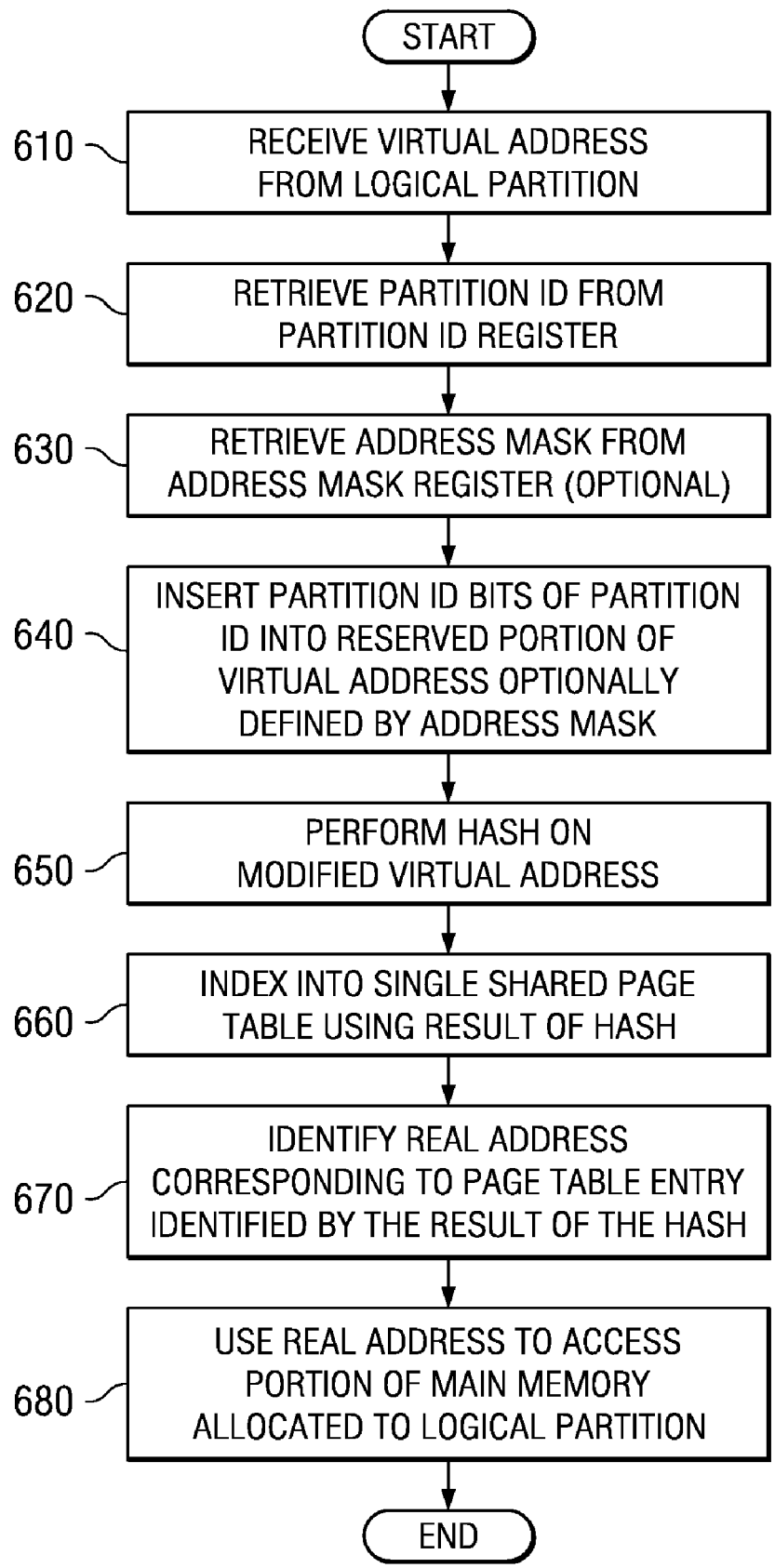
FIG. 6 is a flowchart outlining an exemplary operation for performing a virtual address translation using the common logical partition page table according to one illustrative embodiment.

FIG. 6 is a flowchart outlining an exemplary operation for performing a virtual address translation using the common logical partition page table according to one illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

The operation outlined in FIG. 6 may be performed, for example, by a virtualization mechanism, such as a hypervisor or the like. It is assumed that at least two logical partitions have been created in the data processing system and have been assigned unique partition IDs by the hypervisor in the manner described above. Moreover, one of the partition IDs is loaded into the partition ID register as part of a context switch operation performed by the hypervisor when switching between logical partitions.

As shown in FIG. 6, the operation starts with the hypervisor receiving a virtual address from a currently active logical partition (step 610). The hypervisor retrieves the partition ID from a partition ID register (step 620) and optionally, an address mask from an address mask register (step 630). Based on the address mask, the hypervisor inserts the partition ID bits of the partition ID into a portion of the virtual address defined by the address mask (step 640). The hypervisor then performs a hash on the resulting modified virtual address with the inserted partition ID (step 650).

The hypervisor then uses the resulting hash value to index into a shared page table that stores page table entries for all of the logical partitions in the data processing system (step 660). The resulting page table entry is then used by the hypervisor to identify a real address corresponding to the modified virtual address (step 670). The real address is then used by the hypervisor to access a portion of main memory allocated to the logical partition (step 680). The operation then terminates.

Thus, the mechanisms of the illustrative embodiments provide the ability to use a single shared page table to store the page table entries for all of the logical partitions present in the data processing system. This avoids the problem associated with multiple page tables (i.e. implementing one page table for each logical partition) solution of dynamic logical partition systems where the aggregate size of the page tables may become a significant portion of the available main memory. Since only a single shared page table is utilized for all logical partitions, the amount of memory allocated to this single shared page table may be kept less than a corresponding aggregate of page tables in a system implementing multiple page tables. In other words, the amount of main memory overhead associated with maintaining page tables may be kept at a minimum by using a single shared page table in accordance with the illustrative embodiments.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for virtualizing access to a main memory, comprising:

allocating portions of the main memory to a plurality of logical partitions in the data processing system;

generating a single shared page table having a plurality of page table entries, wherein the plurality of page table entries comprises page table entries for accessing each of the portions of the main memory allocated to each of the logical partitions in the plurality of logical partitions; and utilizing the single shared page table to access the portions of the main memory, wherein utilizing the single shared page table to access the portions of the main memory, comprises:

receiving a request from a logical partition, the request specifying a virtual address for an operation to be performed;

appending, via a hardware mechanism, a logical partition identifier to the virtual address, the logical partition identifier being stored in a hardware register; and retrieving a virtual-to-real address translation from the single shared page table based on a combination of the virtual address and the logical partition identifier appended to the virtual address.

2. The method of claim 1, further comprising:

allocating a logical partition identifier portion of a virtual address space, used by the single shared page table, for specifying a logical partition identifier of an associated logical partition, wherein each logical partition in the plurality of logical partitions has a different unique logical partition identifier.

3. The method of claim 2, wherein, by virtue of the logical partition identifier portion of the virtual address space, each logical partition of the plurality of logical partition generates virtual addresses in their own non-overlapping segments of the virtual address space.

4. The method of claim 2, further comprising:

controlling access to portions of the single shared page table based on the logical partition identifier in the logical partition identifier portion of virtual addresses used to access the single shared page table such that entries in the single shared page table associated with a first logical partition having a first logical partition identifier are not accessible by a second logical partition having a second logical partition identifier.

5. The method of claim 2, wherein the logical partition identifier for a logical partition is assigned to an operating system associated with the logical partition by an input/output virtualization mechanism.

6. The method of claim 5, wherein the logical partition identifiers for each logical partition in the plurality of logical partitions are maintained by the input/output virtualization mechanism, and wherein one logical partition of the plurality of logical partitions cannot access a logical partition identifier of another logical partition in the plurality of logical partitions.

7. The method of claim 1, further comprising:

dynamically modifying an amount of the main memory allocated to a logical partition in the plurality of logical partitions by notifying an input/output virtualization mechanism of the modification, wherein the input/output virtualization mechanism modifies a main memory limit associated with the logical partition and updates main memory pool data structures in response to receiving the notification of the modification.

8. The method of claim 1, wherein each portion of main memory allocated to each logical partition of the plurality of logical partition may be any size portion of the main memory as long as the aggregate of the allocated main memory portions for the plurality of logical partitions does not exceed a total size of the main memory.

9. The method of claim 1, wherein the logical partition identifier stored in the hardware register is only modifiable by a virtualization mechanism upon a logical partition context switch event.

10. A computer program product comprising a computer useable medium having a computer readable program, wherein the computer readable program, when executed on a computing device, causes the computing device to:

allocate portions of the main memory to a plurality of logical partitions in the data processing system;

generate a single shared page table having a plurality of page table entries, wherein the plurality of page table entries comprises page table entries for accessing each of the portions of the main memory allocated to each of the logical partitions in the plurality of logical partitions; and utilize the single shared page table to access the portions of the main memory, wherein the computer readable program causes the computing device to utilize the single shared page table to access the portions of the main memory by:

receiving a request from a logical partition, the request specifying a virtual address for an operation to be performed;

appending, via a hardware mechanism, a logical partition identifier to the virtual address, the logical partition identifier being stored in a hardware register; and retrieving a virtual-to-real address translation from the single shared page table based on a combination of the virtual address and the logical partition identifier appended to the virtual address.

11. The computer program product of claim 10, wherein the computer readable program further causes the computing device to:

allocate a logical partition identifier portion of a virtual address space, used by the single shared page table, for specifying a logical partition identifier of an associated logical partition, wherein each logical partition in the plurality of logical partitions has a different unique logical partition identifier.

12. The computer program product of claim 11, wherein, by virtue of the logical partition identifier portion of the virtual address space, each logical partition of the plurality of logical partition generates virtual addresses in their own non-overlapping segments of the virtual address space.

13. The computer program product of claim 11, wherein the computer readable program further causes the computing device to:

control access to portions of the single shared page table based on the logical partition identifier in the logical partition identifier portion of virtual addresses used to access the single shared page table such that entries in the single shared page table associated with a first logical partition having a first logical partition identifier are not accessible by a second logical partition having a second logical partition identifier.

14. The computer program product of claim 11, wherein the logical partition identifier for a logical partition is assigned to an operating system associated with the logical partition by an input/output virtualization mechanism.

15. The computer program product of claim 14, wherein the logical partition identifiers for each logical partition in the plurality of logical partitions are maintained by the input/output virtualization mechanism, and wherein one logical partition of the plurality of logical partitions cannot access a logical partition identifier of another logical partition in the plurality of logical partitions.

16. The computer program product of claim 10, wherein the computer readable program further causes the computing device to:

dynamically modify an amount of the main memory allocated to a logical partition in the plurality of logical partitions by notifying an input/output virtualization mechanism of the modification, wherein the input/output virtualization mechanism modifies a main memory limit associated with the logical partition and updates main memory pool data structures in response to receiving the notification of the modification.

17. The computer program product of claim 10, wherein each portion of main memory allocated to each logical partition of the plurality of logical partition may be any size portion of the main memory as long as the aggregate of the allocated main memory portions for the plurality of logical partitions does not exceed a total size of the main memory.

18. An apparatus, comprising:
a processor; and
a main memory coupled to the processor, wherein the main memory comprises instructions which, when executed by the processor, cause the processor to:
allocate portions of the main memory to a plurality of logical partitions in the data processing system;
generate a single shared page table having a plurality of page table entries, wherein the plurality of page table entries comprises page table entries for accessing each of the portions of the main memory allocated to each of the logical partitions in the plurality of logical partitions; and
utilize the single shared page table to access the portions of the main memory, wherein the instructions cause the processor to utilize the single shared page table to access the portions of the main memory by:
receiving a request from a logical partition, the request specifying a virtual address for an operation to be performed;
appending, via a hardware mechanism, a logical partition identifier to the virtual address, the logical partition identifier being stored in a hardware register; and
retrieving a virtual-to-real address translation from the single shared page table based on a combination of the virtual address and the logical partition identifier appended to the virtual address.

* * * * *